United States Patent
Hasan et al.

(10) Patent No.: US 12,441,688 B1
(45) Date of Patent: Oct. 14, 2025

(54) CCR5 INHIBITOR

(71) Applicant: KING SAUD UNIVERSITY, Riyadh (SA)

(72) Inventors: Fuad Ameen Saad Hasan, Riyadh (SA); Purnachandra Nagaraju Ganji, Riyadh (SA); Estari Mamidala, Riyadh (SA); Abeer AbdulMoati AlMasri, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 1 day.

(21) Appl. No.: 19/041,219

(22) Filed: Jan. 30, 2025

(51) Int. Cl.
C07D 231/12 (2006.01)
A61K 31/4155 (2006.01)

(52) U.S. Cl.
CPC ........ C07D 231/12 (2013.01); A61K 31/4155 (2013.01)

(58) Field of Classification Search
CPC .......... C07D 231/12; A61K 31/4155
See application file for complete search history.

(56) References Cited

U.S. PATENT DOCUMENTS

| 7,241,317 B2 | 7/2007 | Sabelle et al. |
| 7,977,358 B2 | 7/2011 | Aebi et al. |

OTHER PUBLICATIONS

"1-[4-[(4-Chlorophenyl)Methyl]-1,4-Diazepan-1-YL]-2-(5-Methyl-1H-Pyrazol-3-YL)Ethanone", Create date: Sep. 7, 2016.
"[4-[(4-Chlorophenyl)Methyl]-1,4-Diazepan-1-YL]-(5-Methyl-3-Propan-2-YL-1H-Pyrazol-4-YL)Methanone", Create date: Mar. 2, 2018.
"[4-[(4-Chlorophenyl)Methyl]-1,4-Diazepan-1-YL]-[5-(2-Methylpropyl)-1H-Pyrazol-3-YL]Methanone", Create date: Jan. 25, 2012.
"(4-Bromo-5-Propan-2-YL-1H-Pyrazol-3-YL)-[4-[(4-Chlorophenyl)Methyl]-1,4-Diazepan-1-YL]Methanone", Create date: Jan. 25, 2012.
"(3-Chlorophenyl)-[4-(4,5-Dimethyl-1H-Pyrazole-3-Carbonyl)-1,4-Diazepan-1-YL]Methanone", Create date: Jan. 24, 2019.
"1-[4-(4-Chloro-3-Methylbenzoyl)-1,4-Diazepan-1-YL]-2-(3,5-Dimethyl-1H-Pyrazol-4-YL)Ethanone", Create date: Aug. 24, 2018.
"(3-(4-Chlorophenyl)Azepan-1-YL)(3,5-Dimethyl-1H-Pyrazol-4-YL)Methanone", Create date: Jul. 23, 2014.
"[(3S)-3-(4-Chlorophenyl)Azepan-1-YL]-(3,5-Dimethyl-1H-Pyrazol-4-YL)Methanone", Create date: Dec. 11, 2015.
"[4-[(4-Chlorophenyl)Methyl]Piperazin-1-YL]-(5-Methyl-1H-Pyrazol-4-YL)Methanone", Create date: Mar. 2, 2018.

*Primary Examiner* — Kamal A Saeed
(74) *Attorney, Agent, or Firm* — Nath, Goldberg & Meyer; Joshua B. Goldberg

(57) ABSTRACT

A 4-(4-((4-(5-isopropyl-3-methyl-1H-pyrazole-4-carbonyl)-1,4-diazepan-1-yl)methyl)phenoxy)benzonitrile compound having a structure of formula I:

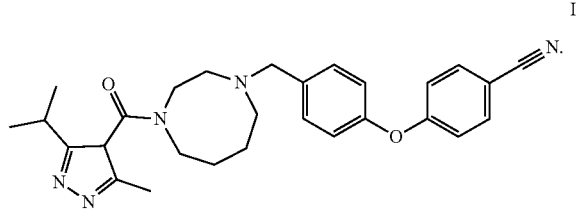

14 Claims, 2 Drawing Sheets

CCR5 INHIBITOR

BACKGROUND

1. Field

The present disclosure relates to an HIV-disruptor and, particularly, to 4-(4-((4-(5-isopropyl-3-methyl-1H-pyrazole-4-carbonyl)-1,4-diazepan-1-yl)methyl)phenoxy)benzonitrile.

2. Description of the Related Art

The HIV-1 virus has spread globally, with around 38.4 million people living with HIV worldwide in 2022. In India, the estimated number of people living with HIV/AIDS in 2022 was approximately 2.3 million. Antiretroviral therapy (ART) is the recommended treatment for individuals with HIV, as it helps them maintain a similar life expectancy to those without the virus by reducing the viral load. However, the successful implementation of antiviral drug therapy has been hindered by high costs, toxicity, and poor patient adherence. Consequently, the development of novel potential antiviral drugs is crucial for the treatment of HIV-1 infection and AIDS.

Current anti-HIV drugs primarily target the viral enzymes Reverse Transcriptase, Integrase, and Protease, as well as the chemokine receptor type 5 (CCR5) entry protein. The chemokine receptor type 5 (CCR5) serves as a physiological receptor for leukocyte chemoattractants and is also an important cell entry co-receptor for HIV-1. The interaction between the HIV-1 glycoprotein gp120 and the cellular receptor CD4 is a critical initial step in viral entry, leading to a conformational change in gp120 and further interaction with the CCR5 or CXCR4 co-receptors. CCR5 belongs to the large family of chemokine receptors, which are expressed on the surface of lymphocytes and other cell types that are involved in signaling and the coordination of immune responses.

Thus, new compounds having desired therapeutic activities and solving the aforementioned problems are desired.

SUMMARY

The present subject matter relates to 4-(4-((4-(5-isopropyl-3-methyl-1H-pyrazole-4-carbonyl)-1,4-diazepan-1-yl)methyl)phenoxy)benzonitrile. As described herein, in vitro CCR5 inhibition studies demonstrate that 4-(4-((4-(5-isopropyl-3-methyl-1H-pyrazole-4-carbonyl)-1,4-diazepan-1-yl)methyl)phenoxy)benzonitrile can effectively target the CCR5 receptor and disrupt the critical HIV-1 viral entry mechanism.

In an embodiment, the present subject matter relates to a 4-(4-((4-(5-isopropyl-3-methyl-1H-pyrazole-4-carbonyl)-1,4-diazepan-1-yl)methyl)phenoxy)benzonitrile compound having the formula I:

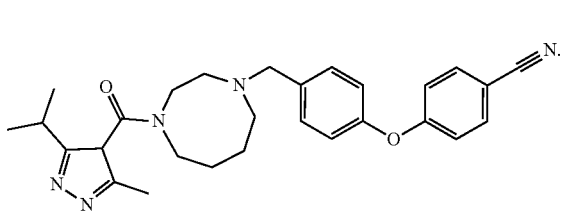

I

In another embodiment, the present subject matter relates to a pharmaceutically acceptable composition comprising a therapeutically effective amount of the 4-(4-((4-(5-isopropyl-3-methyl-1H-pyrazole-4-carbonyl)-1,4-diazepan-1-yl)methyl)phenoxy)benzonitrile compound and a pharmaceutically acceptable carrier.

In another embodiment, the present subject matter relates to a pharmaceutically acceptable composition comprising a therapeutically effective amount of the 4-(4-((4-(5-isopropyl-3-methyl-1H-pyrazole-4-carbonyl)-1,4-diazepan-1-yl)methyl)phenoxy)benzonitrile compound and a pharmaceutically acceptable carrier.

In a further embodiment, the present subject matter relates to a method of inhibiting chemokine receptor type 5 (CCR5) in a patient comprising administering to a patient in need thereof a therapeutically effective amount of the 4-(4-((4-(5-isopropyl-3-methyl-1H-pyrazole-4-carbonyl)-1,4-diazepan-1-yl)methyl)phenoxy)benzonitrile compound. In still another embodiment, the present subject matter relates to a method of binding CCR5 receptors in a patient comprising administering to a patient in need thereof a therapeutically effective amount of the 4-(4-((4-(5-isopropyl-3-methyl-1H-pyrazole-4-carbonyl)-1,4-diazepan-1-yl)methyl)phenoxy)benzonitrile compound.

In another embodiment, the present subject matter relates to a method of treating HIV-1 in a patient comprising administering to a patient in need thereof a therapeutically effective amount of the 4-(4-((4-(5-isopropyl-3-methyl-1H-pyrazole-4-carbonyl)-1,4-diazepan-1-yl)methyl)phenoxy)benzonitrile compound.

In one more embodiment, the present subject matter relates to a method of making the 4-(4-((4-(5-isopropyl-3-methyl-1H-pyrazole-4-carbonyl)-1,4-diazepan-1-yl)methyl)phenoxy)benzonitrile compound, the method comprising: dissolving [4-[(4-chlorophenyl)methyl]-1,4-diazepan-1-yl]-(5-methyl-3-propan-2-yl-1H-pyrazol-4-yl)methanone (ZINC000128130021) and 4-Hydroxybenzonitrile in an organic solvent to obtain a reaction mixture. In an embodiment, the organic solvent is dimethylformamide (DMF). Potassium carbonate can be added to the reaction mixture to deprotonate the hydroxyl group of 4-Hydroxybenzonitrile and obtain phenoxide ions in the reaction mixture. The reaction mixture can be catalyzed by adding tetrakis(triphenylphosphine)palladium(0) as a catalyst. The reaction mixture can be heated and stirred to obtain a crude product. The method may further include purifying the crude product by recrystallization and obtaining the 4-(4-((4-(5-isopropyl-3-methyl-1H-pyrazole-4-carbonyl)-1,4-diazepan-1-yl)methyl)phenoxy)benzonitrile compound.

These and other features of the present subject matter will become readily apparent upon further review of the following specification.

DETAILED DESCRIPTION OF THE PREFERRED EMBODIMENTS

Figure 1:
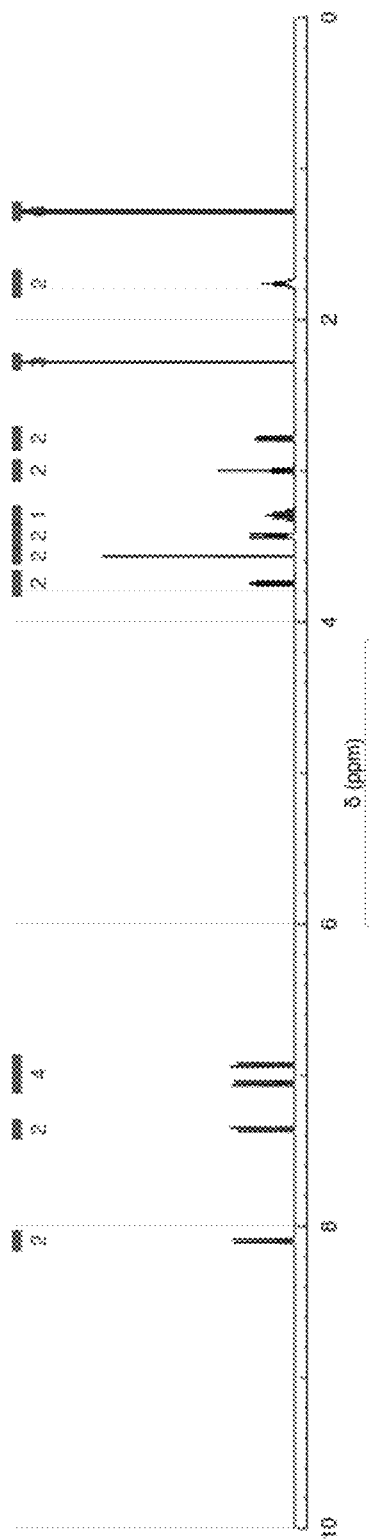
FIG. 1 shows a $^1$H NMR analysis of the 4-(4-((4-(5-isopropyl-3-methyl-1H-pyrazole-4-carbonyl)-1,4-diazepan-1-yl)methyl)phenoxy)benzonitrile compound.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

"Subject" as used herein refers to any animal classified as a mammal, including humans, domestic and farm animals, and zoo, sports, and pet companion animals such as household pets and other domesticated animals such as, but not limited to, cattle, sheep, ferrets, swine, horses, poultry, rabbits, goats, dogs, cats and the like.

"Patient" as used herein refers to a subject in need of treatment of a condition, disorder, or disease, such as cancer.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a 4-(4-((4-(5-isopropyl-3-methyl-1H-pyrazole-4-carbonyl)-1,4-diazepan-1-yl)methyl)phenoxy)benzonitrile compound (also referred to herein as HIV-1 disruptor and CCR5 inhibitor) having the formula I:

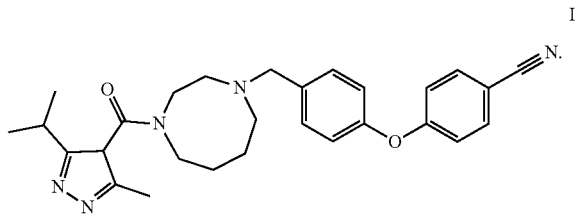 [SMILES: CC1=NN=C(C(C)C)C1C(=O)N1CCCCN(Cc2ccc(Oc3ccc(C#N)cc3)cc2)CC1]

A method of synthesizing 4-(4-((4-(5-isopropyl-3-methyl-1H-pyrazole-4-carbonyl)-1,4-diazepan-1-yl)methyl)phenoxy)benzonitrile can include: dissolving [4-[(4-chlorophenyl)methyl]-1,4-diazepan-1-yl]-(5-methyl-3-propan-2-yl-1H-pyrazol-4-yl)methanone (ZINC000128130021) and 4-Hydroxybenzonitrile in an organic solvent to obtain a reaction mixture. In an embodiment, the organic solvent is dimethylformamide (DMF). Potassium carbonate can be added to the reaction mixture to deprotonate hydroxyl groups of the 4-Hydroxybenzonitrile and obtain phenoxide ions in the reaction mixture. The reaction mixture can be catalyzed by adding tetrakis(triphenylphosphine)palladium (0) as a catalyst. The reaction mixture can be heated and stirred to obtain a crude product. The use of tetrakis(triphenylphosphine)palladium(0) as a catalyst is noteworthy, as it facilitates the coupling reaction under relatively mild conditions (90° C. for 18 hours), which could be advantageous for industrial applications.

In an embodiment, the reaction can be carried out in dimethylformamide (DMF) with potassium carbonate to deprotonate hydroxyl groups, followed by heating and stirring to ensure complete reaction. The use of a catalyst makes the reaction an efficient and potentially scalable method for synthesizing the 4-(4-((4-(5-isopropyl-3-methyl-1H-pyrazole-4-carbonyl)-1,4-diazepan-1-yl)methyl)phenoxy)benzonitrile compound.

The 4-(4-((4-(5-isopropyl-3-methyl-1H-pyrazole-4-carbonyl)-1,4-diazepan-1-yl)methyl)phenoxy)benzonitrile compound can be purified through column chromatography and characterized using NMR and mass spectrometry. The purification process using column chromatography and subsequent characterization by NMR and mass spectrometry ensure high purity and accurate structural confirmation of the synthesized compound.

In the chemokine receptor type 5 (CCR5) binding inhibition assays described herein, the 4-(4-((4-(5-isopropyl-3-methyl-1H-pyrazole-4-carbonyl)-1,4-diazepan-1-yl)methyl)phenoxy)benzonitrile compound was tested against the standard drug Maraviroc using Chinese hamster ovary (CHO) cells expressing the CCR5 receptor. The inhibitory activity was measured, and the $IC_{50}$ values were determined. The 4-(4-((4-(5-isopropyl-3-methyl-1H-pyrazole-4-carbonyl)-1,4-diazepan-1-yl)methyl)phenoxy)benzonitrile compound demonstrated slightly better inhibitory activity than Maraviroc, with a lower $IC_{50}$ value (2.62 nM vs. 2.91 nM), indicating higher potency. Accordingly, it is believed that the 4-(4-((4-(5-isopropyl-3-methyl-1H-pyrazole-4-carbonyl)-1,4-diazepan-1-yl)methyl)phenoxy)benzonitrile compound is a more effective CCR5 inhibitor, which could have significant implications for therapeutic applications in treating diseases like HIV/AIDS.

In an embodiment, the present subject matter relates to a 4-(4-((4-(5-isopropyl-3-methyl-1H-pyrazole-4-carbonyl)-1,4-diazepan-1-yl)methyl)phenoxy)benzonitrile compound having the formula I:

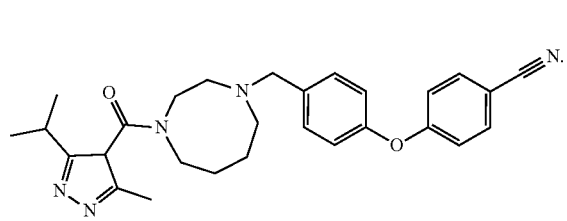

I

In another embodiment, the present subject matter relates to a pharmaceutically acceptable composition comprising a therapeutically effective amount of the 4-(4-((4-(5-isopropyl-3-methyl-1H-pyrazole-4-carbonyl)-1,4-diazepan-1-yl)methyl)phenoxy)benzonitrile compound and a pharmaceutically acceptable carrier.

In this regard, the present subject matter is further directed to pharmaceutical compositions comprising a therapeutically effective amount of the compound as described herein together with one or more pharmaceutically acceptable carriers, excipients, or vehicles. In some embodiments, the present compositions can be used for combination therapy, where other therapeutic and/or prophylactic ingredients can be included therein.

The present subject matter further relates to a pharmaceutical composition, which comprises the present compound together with at least one pharmaceutically acceptable auxiliary.

Non-limiting examples of suitable excipients, carriers, or vehicles useful herein include liquids such as water, saline, glycerol, polyethyleneglycol, hyaluronic acid, ethanol, and the like. Suitable excipients for nonliquid formulations are also known to those of skill in the art. A thorough discussion of pharmaceutically acceptable excipients and salts useful herein is available in Remington's Pharmaceutical Sciences, 18th Edition. Easton, Pa., Mack Publishing Company, 1990, the entire contents of which are incorporated by reference herein.

The present compound is typically administered at a therapeutically or pharmaceutically effective dosage, e.g., a dosage sufficient to provide treatment for cancer or a microbial infection. Administration of the compound or pharmaceutical compositions thereof can be by any method that delivers the compound systemically and/or locally. These methods include oral routes, parenteral routes, intraduodenal routes, and the like.

While human dosage levels have yet to be optimized for the present compound, generally, a daily dose is from about 0.01 to 10.0 mg/kg of body weight, for example about 0.1 to 5.0 mg/kg of body weight. The precise effective amount will vary from subject to subject and will depend upon the species, age, the subject's size and health, the nature and extent of the condition being treated, recommendations of the treating physician, and the therapeutics or combination of therapeutics selected for administration. The subject may be administered as many doses as is required to reduce and/or alleviate the signs, symptoms, or causes of the disease or disorder in question, or bring about any other desired alteration of a biological system.

In employing the present compound for treatment of HIV-1, any pharmaceutically acceptable mode of administration can be used with other pharmaceutically acceptable excipients, including solid, semi-solid, liquid or aerosol dosage forms, such as, for example, tablets, capsules, powders, liquids, suspensions, suppositories, aerosols or the like. The present compounds can also be administered in sustained or controlled release dosage forms, including depot injections, osmotic pumps, pills, transdermal (including electrotransport) patches, and the like, for the prolonged administration of the compound at a predetermined rate, preferably in unit dosage forms suitable for single administration of precise dosages.

The present compounds may also be administered as compositions prepared as foods for humans or animals, including medical foods, functional food, special nutrition foods and dietary supplements. A "medical food" is a product prescribed by a physician that is intended for the specific dietary management of a disorder or health condition for which distinctive nutritional requirements exist and may include formulations fed through a feeding tube (referred to as enteral administration or gavage administration).

A "dietary supplement" shall mean a product that is intended to supplement the human diet and may be provided in the form of a pill, capsule, tablet, or like formulation. By way of non-limiting example, a dietary supplement may include one or more of the following dietary ingredients: vitamins, minerals, herbs, botanicals, amino acids, and dietary substances intended to supplement the diet by increasing total dietary intake, or a concentrate, metabolite, constituent, extract, or combinations of these ingredients, not intended as a conventional food or as the sole item of a meal or diet. Dietary supplements may also be incorporated into foodstuffs, such as functional foods designed to promote control of glucose levels. A "functional food" is an ordinary food that has one or more components or ingredients incorporated into it to give a specific medical or physiological benefit, other than a purely nutritional effect. "Special nutrition food" means ingredients designed for a particular diet related to conditions or to support treatment of nutritional deficiencies.

Generally, depending on the intended mode of administration, the pharmaceutically acceptable composition will contain about 0.1% to 90%, for example about 0.5% to 50%, by weight of the present compound, the remainder being suitable pharmaceutical excipients, carriers, etc.

One manner of administration for the conditions detailed above is oral, using a convenient daily dosage regimen which can be adjusted according to the degree of affliction. For such oral administration, a pharmaceutically acceptable, non-toxic composition is formed by the incorporation of any of the normally employed excipients, such as, for example, mannitol, lactose, starch, magnesium stearate, sodium saccharine, talcum, cellulose, sodium croscarmellose, glucose, gelatin, sucrose, magnesium carbonate, and the like. Such compositions take the form of solutions, suspensions, tablets, dispersible tablets, pills, capsules, powders, sustained release formulations and the like.

The present compositions may take the form of a pill or tablet and thus the composition may contain, along with the active ingredient, a diluent such as lactose, sucrose, dicalcium phosphate, or the like; a lubricant such as magnesium stearate or the like; and a binder such as starch, gum acacia, polyvinyl pyrrolidine, gelatin, cellulose and derivatives thereof, and the like.

Liquid pharmaceutically administrable compositions can, for example, be prepared by dissolving, dispersing, etc. an active compound as defined above and optional pharmaceutical adjuvants in a carrier, such as, for example, water, saline, aqueous dextrose, glycerol, glycols, ethanol, and the like, to thereby form a solution or suspension. If desired, the pharmaceutical composition to be administered may also contain minor amounts of nontoxic auxiliary substances such as wetting agents, emulsifying agents, or solubilizing agents, pH buffering agents and the like, for example, sodium acetate, sodium citrate, cyclodextrin derivatives, sorbitan monolaurate, triethanolamine acetate, triethanolamine oleate, etc.

For oral administration, a pharmaceutically acceptable non-toxic composition may be formed by the incorporation of any normally employed excipients, such as, for example, pharmaceutical grades of mannitol, lactose, starch, magnesium stearate, talcum, cellulose derivatives, sodium croscarmellose, glucose, sucrose, magnesium carbonate, sodium saccharin, talcum and the like. Such compositions take the form of solutions, suspensions, tablets, capsules, powders, sustained release formulations and the like.

For a solid dosage form, a solution or suspension in, for example, propylene carbonate, vegetable oils or triglycerides, may be encapsulated in a gelatin capsule. Such diester solutions, and the preparation and encapsulation thereof, are disclosed in U.S. Pat. Nos. 4,328,245; 4,409,239; and 4,410,545, the contents of each of which are incorporated herein by reference. For a liquid dosage form, the solution, e.g., in a polyethylene glycol, may be diluted with a sufficient quantity of a pharmaceutically acceptable liquid carrier, e.g., water, to be easily measured for administration.

Alternatively, liquid or semi-solid oral formulations may be prepared by dissolving or dispersing the active compound or salt in vegetable oils, glycols, triglycerides, propylene glycol esters (e.g., propylene carbonate) and the like, and encapsulating these solutions or suspensions in hard or soft gelatin capsule shells.

Other useful formulations include those set forth in U.S. Pat. Nos. Re. 28,819 and 4,358,603, the contents of each of which are hereby incorporated by reference.

Another manner of administration is parenteral administration, generally characterized by injection, either subcutaneously, intramuscularly or intravenously. Injectables can be prepared in conventional forms, either as liquid solutions or suspensions, solid forms suitable for solution or suspension in liquid prior to injection, or as emulsions. Suitable excipients are, for example, water, saline, dextrose, glycerol, ethanol or the like. In addition, if desired, the pharmaceutical compositions to be administered may also contain minor amounts of non-toxic auxiliary substances such as wetting or emulsifying agents, pH buffering agents, solubility enhancers, and the like, such as for example, sodium acetate, sorbitan monolaurate, triethanolamine oleate, cyclodextrins, etc.

Another approach for parenteral administration employs the implantation of a slow-release or sustained-release system, such that a constant level of dosage is maintained. The percentage of active compound contained in such parenteral compositions is highly dependent on the specific nature thereof, as well as the activity of the compound and the needs of the subject. However, percentages of active ingredient of 0.01% to 10% in solution are employable and will be higher if the composition is a solid which will be subsequently diluted to the above percentages. The composition may comprise 0.2% to 2% of the active agent in solution.

Nasal solutions of the active compound alone or in combination with other pharmaceutically acceptable excipients can also be administered.

Formulations of the active compound or a salt may also be administered to the respiratory tract as an aerosol or solution for a nebulizer, or as a microfine powder for insufflation, alone or in combination with an inert carrier such as lactose. In such a case, the particles of the formulation have diameters of less than 50 microns, for example less than 10 microns.

In a further embodiment, the present subject matter relates to a method of treating HIV-1 in a patient comprising administering to a patient in need thereof a therapeutically effective amount of the 4-(4-((4-(5-isopropyl-3-methyl-1H-pyrazole-4-carbonyl)-1,4-diazepan-1-yl)methyl)phenoxy) benzonitrile compound.

In certain embodiments in this regard, the present subject matter relates to a method of inhibiting CCR5 in a patient comprising administering to a patient in need thereof a therapeutically effective amount of the 4-(4-((4-(5-isopropyl-3-methyl-1H-pyrazole-4-carbonyl)-1,4-diazepan-1-yl) methyl)phenoxy)benzonitrile compound. In some embodiments, the 4-(4-((4-(5-isopropyl-3-methyl-1H-pyrazole-4-carbonyl)-1,4-diazepan-1-yl)methyl)phenoxy)benzonitrile compound may demonstrate inhibition rates of at least about 24.5%, about 39.8%, about 59.1%, about 78.2%, and about 91.3% at concentrations of 1 nM, 10 nM, 100 nM, 1000 nM, and 2000 nM, respectively.

In another embodiment, the present subject matter relates to a method of binding CCR5 receptors in a patient including administering to a patient in need thereof a therapeutically effective amount of the 4-(4-((4-(5-isopropyl-3-methyl-1H-pyrazole-4-carbonyl)-1,4-diazepan-1-yl)methyl)phenoxy) benzonitrile compound. In other embodiments, the 4-(4-((4-

(5-isopropyl-3-methyl-1H-pyrazole-4-carbonyl)-1,4-diazepan-1-yl)methyl)phenoxy)benzonitrile compound may exhibit an $IC_{50}$ value of 2.62 nM in CCR5 binding inhibition assays.

In one more embodiment, the present subject matter relates to a method of making the 4-(4-((4-(5-isopropyl-3-methyl-1H-pyrazole-4-carbonyl)-1,4-diazepan-1-yl)methyl)phenoxy)benzonitrile compound including dissolving [4-[(4-chlorophenyl)methyl]-1,4-diazepan-1-yl]-(5-methyl-3-propan-2-yl-1H-pyrazol-4-yl)methanone (ZINC000128130021) and 4-Hydroxybenzonitrile in DMF to obtain a reaction mixture and adding potassium carbonate to the reaction mixture to deprotonate hydroxyl groups of the 4-Hydroxybenzonitrile and obtain phenoxide ions. The reaction mixture may be catalyzed by adding tetrakis(triphenylphosphine)palladium(0) as a catalyst and heating and stirring the reaction mixture to obtain a crude product. The method may further include purifying the crude product by recrystallization (using absolute ethyl alcohol) to obtain the 4-(4-((4-(5-isopropyl-3-methyl-1H-pyrazole-4-carbonyl)-1,4-diazepan-1-yl)methyl)phenoxy)benzonitrile compound.

The present production methods can be further seen by referring to the following Scheme 1:

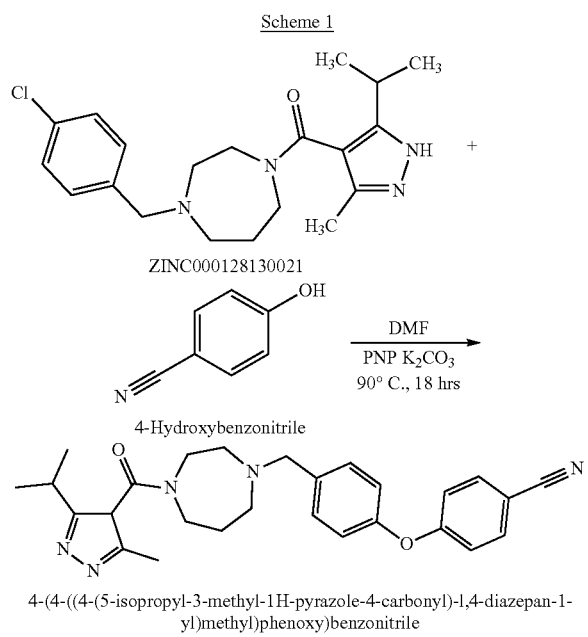

Scheme 1

In a further embodiment of the present production methods, the method may include quenching the reaction mixture with water and neutralizing with aqueous hydrochloric acid. In some embodiments, the reaction may be quenched with 20 mL of water. In other embodiments, the reaction may be neutralized with 10 mL aqueous hydrochloric acid. In various embodiments, the aqueous hydrochloric acid may be 1 M. The method may include extracting the 4-(4-((4-(5-isopropyl-3-methyl-1H-pyrazole-4-carbonyl)-1,4-diazepan-1-yl)methyl)phenoxy)benzonitrile compound with ethyl acetate and purifying using column chromatography on silica gel with a hexane/ethyl acetate solvent system. In various embodiments, the 4-(4-((4-(5-isopropyl-3-methyl-1H-pyrazole-4-carbonyl)-1,4-diazepan-1-yl)methyl)phenoxy)benzonitrile compound may be extracted with 3×20 mL of ethyl acetate. Combined organic layers may be washed with 20 mL of water and 20 mL of brine. The 4-(4-((4-(5-isopropyl-3-methyl-1H-pyrazole-4-carbonyl)-1,4-diazepan-1-yl)methyl)phenoxy)benzonitrile may then by dried over anhydrous sodium sulfate. In various embodiments, at least about 2 g of anhydrous sodium sulfate may be used.

In a further embodiment of the present production methods, the [4-[(4-chlorophenyl)methyl]-1,4-diazepan-1-yl]-(5-methyl-3-propan-2-yl-1H-pyrazol-4-yl)methanone (ZINC000128130021), 4-Hydroxybenzonitrile, potassium carbonate, and tetrakis(triphenylphosphine)palladium(0) may be added in about a 1:1:1:1 molar ratio.

In an embodiment of the present production methods, heating the reaction mixture comprises heating the reaction mixture to about 90° C.

In an additional embodiment of the present production methods, stirring the reaction mixture involves stirring for at least about 18 hours.

In another embodiment of the present production methods, the percentage yield may be 75.5%.

The following examples relate to various methods of manufacturing the specific compounds and application of the same, as described herein. All compound numbers expressed herein are with reference to the synthetic pathway figures shown above.

EXAMPLES

Example 1

Synthesis of 4-(4-((4-(5-isopropyl-3-methyl-1H-pyrazole-4-carbonyl)-1,4-diazepan-1-yl)methyl)phenoxy)benzonitrile The synthesis of the 4-(4-((4-(5-isopropyl-3-methyl-1H-pyrazole-4-carbonyl)-1,4-diazepan-1-yl)methyl)phenoxy) benzonitrile compound began by dissolving 1.5 equivalents of [4-[(4-chlorophenyl)methyl]-1,4-diazepan-1-yl]-(5-methyl-3-propan-2-yl-1H-pyrazol-4-yl)methanone (ZINC000128130021) (e.g., 1.5 mmol, 0.75 g) and 1.5 equivalents of 4-Hydroxybenzonitrile (e.g., 1.5 mmol, 0.18 g) in 10 mL of DMF. Potassium carbonate (1.5 equivalents, e.g., 1.5 mmol, 0.21 g) was then added to deprotonate the hydroxyl group of 4-Hydroxybenzonitrile, forming the phenoxide ion. Subsequently, tetrakis(triphenylphosphine)palladium(0) (1.5 equivalents, e.g., 1.5 mmol, 1.73 g) was introduced as a catalyst to facilitate the coupling reaction. The reaction mixture was heated to 90° C. and stirred for 18 hours to ensure complete reaction. After cooling to room temperature, the reaction mixture was quenched with 20 mL of water and neutralized with 10 mL of aqueous hydrochloric acid (1 M). The 4-(4-((4-(5-isopropyl-3-methyl-1H-pyrazole-4-carbonyl)-1,4-diazepan-1-yl)methyl)phenoxy)benzonitrile was extracted with 3×20 mL of ethyl acetate, and the combined organic layers were washed with 20 mL of water and 20 mL of brine, then dried over anhydrous sodium sulfate (2 g). The organic layer was concentrated under reduced pressure using a rotary evaporator to obtain the crude product. This crude product was purified using column chromatography on silica gel and eluted with a hexane/ethyl acetate solvent system (70:30). The yield of the novel compound is 686.88 mg or 75.7%. This final product was characterized using NMR and mass spectrometry to confirm its structure.

Figure 2:
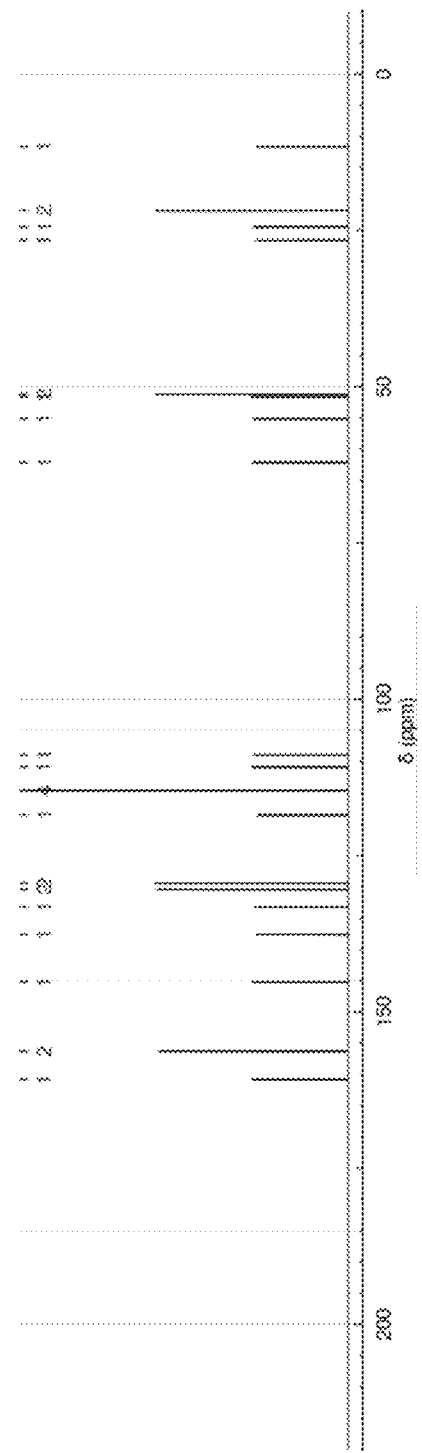
FIG. 2 shows a $^{13}$C NMR analysis of the 4-(4-((4-(5-isopropyl-3-methyl-1H-pyrazole-4-carbonyl)-1,4-diazepan-1-yl)methyl)phenoxy)benzonitrile compound.
Figure 3:
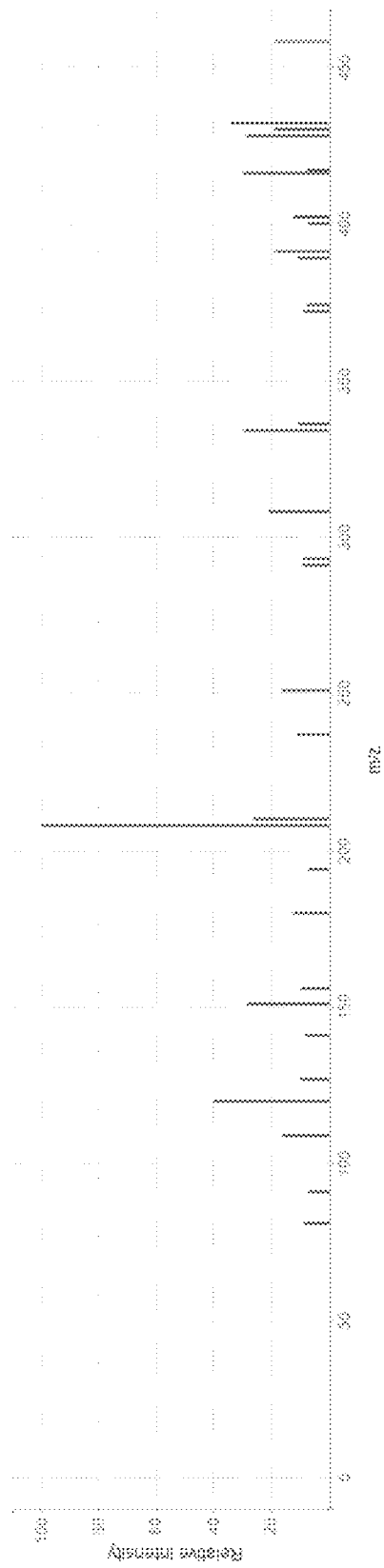
FIG. 3 shows a Mass spectra of the 4-(4-((4-(5-isopropyl-3-methyl-1H-pyrazole-4-carbonyl)-1,4-diazepan-1-yl)methyl)phenoxy)benzonitrile compound.

Characterization of the prepared compound using $^1$H NMR, $^{13}$C NMR, and Mass Spectrometry analysis is shown in FIGS. 1-3, respectively. Chemical Formula: $C_{27}H_{31}N_5O_2$; Molecular Weight: 457.25.

$^1$H NMR: δ 1.28 (6H, d, J=6.9 Hz), 1.76 (2H, ddddd, J=13.3, 7.0, 6.7, 2.7, 1.9 Hz), 2.28 (3H, s), 2.78 (2H, ddd, J=11.3, 6.7, 2.7 Hz), 3.00 (2H, ddd, J=7.2, 5.4, 3.1 Hz), 3.29 (1H, sept, J=6.9 Hz), 3.43 (2H, ddd, J=14.1, 7.0, 1.9 Hz), 3.56 (2H, s), 3.74 (2H, ddd, J=15.0, 7.0, 3.3 Hz), 6.87-7.12 (4H, 6.93 (ddd, J=8.2, 1.3, 0.5 Hz), 7.05 (ddd, J=8.3, 1.3, 0.5 Hz)), 7.36 (2H, ddd, J=8.2, 1.1, 0.5 Hz), 8.09 (2H, ddd, J=8.3, 1.9, 0.5 Hz).

$^{13}$C NMR: $^{13}$C NMR: δ 11.6 (1C, s), 21.8 (2C, s), 24.4 (1C, s), 26.6 (1C, s), 51.2-51.3 (2C, 51.2 (s), 51.2 (s)), 51.6 (1C, s), 55.1 (1C, s), 62.1 (1C, s), 108.9 (1C, s), 110.8 (1C, s), 114.5-114.6 (4C, 114.6 (s), 114.6 (s)), 118.5 (1C, s), 129.4 (2C, s), 130.4 (2C, s), 133.2 (1C, s), 137.6 (1C, s), 145.2 (1C, s), 156.2-156.3 (2C, 156.3 (s), 156.3 (s)), 160.8 (1C, s).

m/z: 457.25 (100.0%), 458.25 (29.2%), 459.25 (2.7%), 458.24 (1.8%), 459.25 (1.4%).

Example 2

CCR5 Binding Inhibition Assays

All of the reagents and cell lines were obtained from commercial suppliers like Sigma Aldrich, Merck India Ltd., Himedia, and Rankem chemicals. Chinese Hamster Ovaries (CHO) cells expressing the CCR5 receptor were maintained in Ham's F-12 medium supplemented with 10% fetal calf serum, 50 units of penicillin per milliliter, and 50 micrograms of streptomycin per milliliter, in the presence of 5 micrograms of blasticidin S hydrochloride per milliliter. The CCR5-expressing CHO cells were incubated with EZ-link sulfo-NHS-SS-biotin in the presence of the indicated concentrations of the 4-(4-((4-(5-isopropyl-3-methyl-1H-pyrazole-4-carbonyl)-1,4-diazepan-1-yl)methyl)phenoxy)benzonitrile compound and the standard drug Maraviroc, separately, for 1 hour at 37° C. The cells were then washed. To measure the inhibitory activity of the anti-HIV-1 agents on the binding to the CCR5-expressing cells, the test compounds (4-(4-((4-(5-isopropyl-3-methyl-1H-pyrazole-4-carbonyl)-1,4-diazepan-1-yl)methyl)phenoxy)benzonitrile compound and the standard drug Maraviroc) were added to the fixed CCR5-expressing CHO cells. The inhibitory activity of the compounds on CCR5 binding was calculated using the formula: $[1-(E-N)/(P-N)] \times 100\%$.

In this formula, N represents the absorbance at 450 nm in the negative control (the control antibody), while P corresponds to the absorbance in the positive control (the detecting antibody). E corresponds to the absorbance of the test compounds. The drug concentrations that resulted in a 50% inhibition ($IC_{50}$) of the mean absorbance intensity were then determined.

The CCR5 binding profiles of 4-(4-((4-(5-isopropyl-3-methyl-1H-pyrazole-4-carbonyl)-1,4-diazepan-1-yl)methyl)phenoxy)benzonitrile compound were determined and compared with those of previously published CCR5 inhibitor, Maraviroc, using in vitro CCR5 inhibition studies. The data was analyzed using non-linear regression analysis to determine the $IC_{50}$ values for both compounds.

The 4-(4-((4-(5-isopropyl-3-methyl-1H-pyrazole-4-carbonyl)-1,4-diazepan-1-yl)methyl)phenoxy)benzonitrile compound showed comparable or slightly better inhibitory activity compared to the standard drug Maraviroc. At lower concentrations (1 nM and 10 nM), the test compound exhibited slightly higher percent inhibition (24.5% and 39.8%, respectively), while at higher concentrations (100 nM, 1000 nM, and 2000 nM), the percent inhibition for both compounds was similar, with the test compound showing a slightly higher inhibition at 2000 nM (91.3%) compared to Maraviroc (85.3%) (Table 1). The estimated $IC_{50}$ value for the test compound (2.62 nM) was slightly lower than the $IC_{50}$ value for the standard drug Maraviroc (2.91 nM), suggesting that the test compound is slightly more potent in inhibiting the target.

TABLE 1

| SI. No | Concentrations of compounds (nM) | Percent inhibtion of novel compound and standard drug against CCR5 | |
| --- | --- | --- | --- |
| | | Novel Compound | Maraviroc (standard drug) |
| 1 | 1 | 24.5 ± 3.34 | 20.0 ± 1.93 |
| 2 | 10 | 39.8 ± 4.43 | 28.5 ± 2.40 |
| 3 | 100 | 59.1 ± 3.12 | 55.1 ± 2.81 |
| 4 | 1000 | 78.2 ± 4.75 | 68.2 ± 2.97 |
| 5 | 2000 | 91.3 ± 3.87 | 85.3 ± 3.72 |
| 6 | $IC_{50}$ (nM) | 2.62 | 2.91 |

Figure 4:
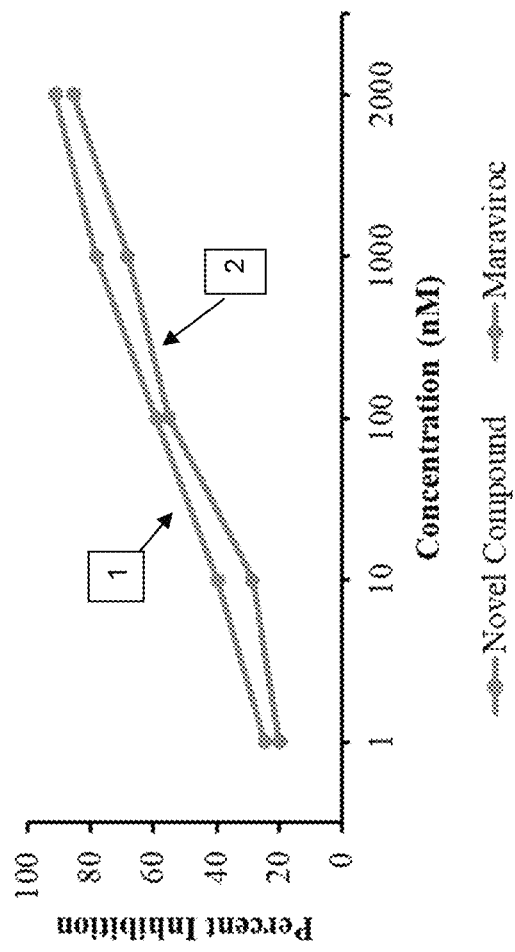
FIG. 4 shows a dose-response plot comparing the inhibition binding to chemokine receptor type 5 (CCR5) by the 4-(4-((4-(5-isopropyl-3-methyl-1H-pyrazole-4-carbonyl)-1,4-diazepan-1-yl)methyl)phenoxy)benzonitrile compound and Maraviroc.

Inhibitory Activity of 4-(4-((4-(5-isopropyl-3-methyl-1H-pyrazole-4-carbonyl)-1,4-diazepan-1-yl)methyl)phenoxy)benzonitrile Compound and Maraviroc (reference drug) on CCR5 Receptor Binding Except for the reagents used as negative controls, novel compound and Maraviroc showed dose-dependent inhibition, and their corresponding $IC_{50}$ values are shown in Table 1. The dose-response curve for 4-(4-((4-(5-isopropyl-3-methyl-1H-pyrazole-4-carbonyl)-1,4-diazepan-1-yl)methyl)phenoxy)benzonitrile compound is depicted in FIG. 4 where 4-(4-((4-(5-isopropyl-3-methyl-1H-pyrazole-4-carbonyl)-1,4-diazepan-1-yl)methyl)phenoxy)benzonitrile is represented by line 1 and Maraviroc is represented by line 2.

4-(4-((4-(5-isopropyl-3-methyl-1H-pyrazole-4-carbonyl)-1,4-diazepan-1-yl)methyl)phenoxy)benzonitrile compound demonstrated superior CCR5 binding properties compared to the established inhibitor Maraviroc, with a lower $IC_{50}$ value indicating higher potency. The rigorous purification and comprehensive characterization confirmed the compound's unique properties, highlighting its potential for therapeutic applications, particularly in treating diseases like HIV/AIDS and certain cancers.

It is to be understood that the 4-(4-((4-(5-isopropyl-3-methyl-1H-pyrazole-4-carbonyl)-1,4-diazepan-1-yl)methyl)phenoxy)benzonitrile compound, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A 4-(4-((4-(5-isopropyl-3-methyl-1H-pyrazole-4-carbonyl)-1,4-diazepan-1-yl)methyl)phenoxy)benzonitrile compound having the formula I:

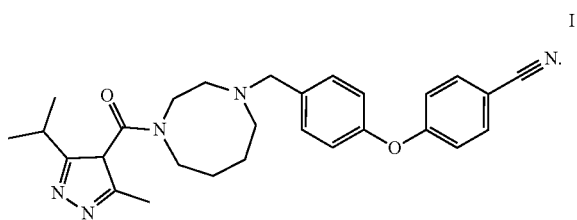 [SMILES: CC1=NN=C(C(C)C)C1C(=O)N1CCCCN(Cc2ccc(Oc3ccc(C#N)cc3)cc2)CC1]

2. A pharmaceutically acceptable composition comprising a therapeutically effective amount of the 4-(4-((4-(5-isopropyl-3-methyl-1H-pyrazole-4-carbonyl)-1,4-diazepan-1-yl)methyl)phenoxy)benzonitrile compound of claim 1 and a pharmaceutically acceptable carrier.

3. A method of inhibiting chemokine receptor type 5 (CCR5) in a patient comprising administering to a patient in need thereof a therapeutically effective amount of the 4-(4-((4-(5-isopropyl-3-methyl-1H-pyrazole-4-carbonyl)-1,4-diazepan-1-yl)methyl)phenoxy)benzonitrile compound of claim 1.

4. The method of claim 3, wherein the 4-(4-((4-(5-isopropyl-3-methyl-1H-pyrazole-4-carbonyl)-1,4-diazepan-1-yl)methyl)phenoxy)benzonitrile compound demonstrates inhibition rates of at least about 24.5%, about 39.8%, about 59.1%, about 78.2%, and about 91.3% at concentrations of 1 nM, 10 nM, 100 nM, 1000 nM, and 2000 nM, respectively.

5. A method of binding CCR5 receptors in a patient comprising administering to a patient in need thereof a therapeutically effective amount of the 4-(4-((4-(5-isopropyl-3-methyl-1H-pyrazole-4-carbonyl)-1,4-diazepan-1-yl)methyl)phenoxy)benzonitrile compound of claim 1.

6. The method of claim 5, wherein the 4-(4-((4-(5-isopropyl-3-methyl-1H-pyrazole-4-carbonyl)-1,4-diazepan-1-yl)methyl)phenoxy)benzonitrile compound exhibits an $IC_{50}$ value of 2.62 nM in CCR5 binding inhibition assays.

7. A method of treating HIV-1 in a patient comprising administering to a patient in need thereof a therapeutically effective amount of the 4-(4-((4-(5-isopropyl-3-methyl-1H-pyrazole-4-carbonyl)-1,4-diazepan-1-yl)methyl)phenoxy)benzonitrile compound of claim 1.

8. A method of making the 4-(4-((4-(5-isopropyl-3-methyl-1H-pyrazole-4-carbonyl)-1,4-diazepan-1-yl)methyl)phenoxy)benzonitrile compound of claim 1, the method comprising:
dissolving [4-[(4-chlorophenyl)methyl]-1,4-diazepan-1-yl]-(5-methyl-3-propan-2-yl-1H-pyrazol-4-yl)methanone (ZINC000128130021) and 4-Hydroxybenzonitrile in 10 mL of DMF to obtain a reaction mixture;
adding potassium carbonate to the reaction mixture to deprotonate hydroxyl groups of the 4-Hydroxybenzonitrile and obtaining phenoxide ions;
catalyzing the reaction mixture by adding tetrakis(triphenylphosphine)palladium(0) as a catalyst;
heating and stirring the reaction mixture to obtain a crude product;
purifying the crude product by recrystallization; and
obtaining the 4-(4-((4-(5-isopropyl-3-methyl-1H-pyrazole-4-carbonyl)-1,4-diazepan-1-yl)methyl)phenoxy)benzonitrile compound.

9. The method of making the 4-(4-((4-(5-isopropyl-3-methyl-1H-pyrazole-4-carbonyl)-1,4-diazepan-1-yl)methyl)phenoxy)benzonitrile compound of claim 8, further comprising:
quenching the reaction mixture with water and neutralizing with aqueous hydrochloric acid; and
extracting the 4-(4-((4-(5-isopropyl-3-methyl-1H-pyrazole-4-carbonyl)-1,4-diazepan-1-yl)methyl)phenoxy)benzonitrile with ethyl acetate and purifying using column chromatography on silica gel with a hexane/ethyl acetate solvent system.

10. The method of making the 4-(4-((4-(5-isopropyl-3-methyl-1H-pyrazole-4-carbonyl)-1,4-diazepan-1-yl)methyl)phenoxy)benzonitrile compound of claim 8, wherein quenching the reaction mixture includes adding 20 mL of water to the reaction mixture.

11. The method of making the 4-(4-((4-(5-isopropyl-3-methyl-1H-pyrazole-4-carbonyl)-1,4-diazepan-1-yl)methyl)phenoxy)benzonitrile compound of claim 8, wherein the [4-[(4-chlorophenyl)methyl]-1,4-diazepan-1-yl]-(5-methyl-3-propan-2-yl-1H-pyrazol-4-yl)methanone (ZINC000128130021), 4-hydroxybenzonitrile, potassium carbonate, and tetrakis(triphenylphosphine)palladium(0) are added in about a 1:1:1:1 molar ratio.

12. The method of making the 4-(4-((4-(5-isopropyl-3-methyl-1H-pyrazole-4-carbonyl)-1,4-diazepan-1-yl)methyl)phenoxy)benzonitrile compound of claim 8, wherein heating the reaction mixture comprises heating the reaction mixture to 90° C.

13. The method of making the 4-(4-((4-(5-isopropyl-3-methyl-1H-pyrazole-4-carbonyl)-1,4-diazepan-1-yl)methyl)phenoxy)benzonitrile compound of claim 8, wherein stirring the reaction mixture involves stirring for at least about 18 hours.

14. The method of making the 4-(4-((4-(5-isopropyl-3-methyl-1H-pyrazole-4-carbonyl)-1,4-diazepan-1-yl)methyl)phenoxy)benzonitrile compound of claim 8, wherein the percentage yield is 75.5%.

* * * * *